Oct. 2, 1962      H. G. HEINRICH      3,056,568
AERODYNAMIC RETARDATION DEVICE
Filed April 20, 1959      3 Sheets-Sheet 2
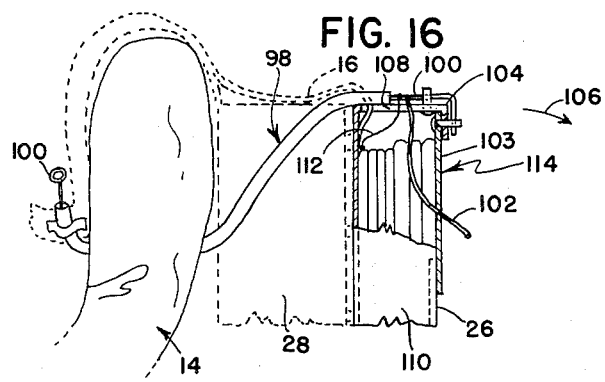
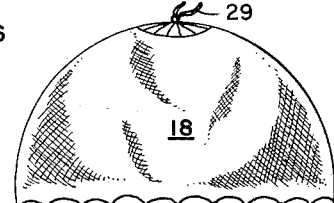
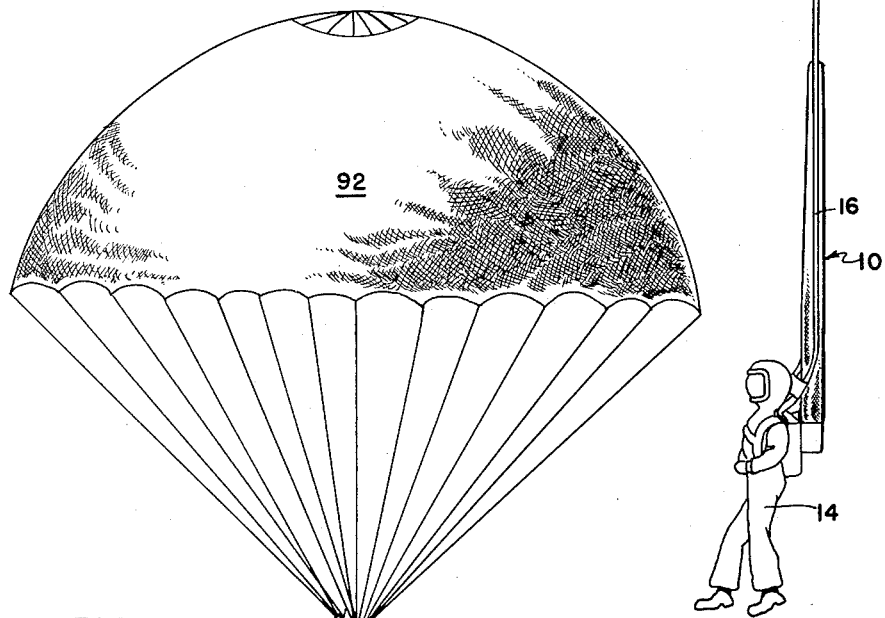
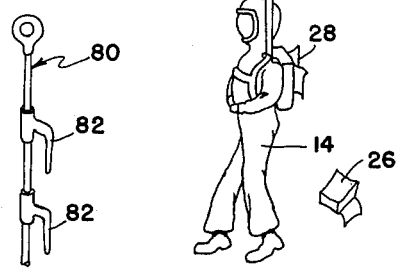
*INVENTOR.*
HELMUT G. HEINRICH
BY
*William C. Babcock*
ATTORNEY

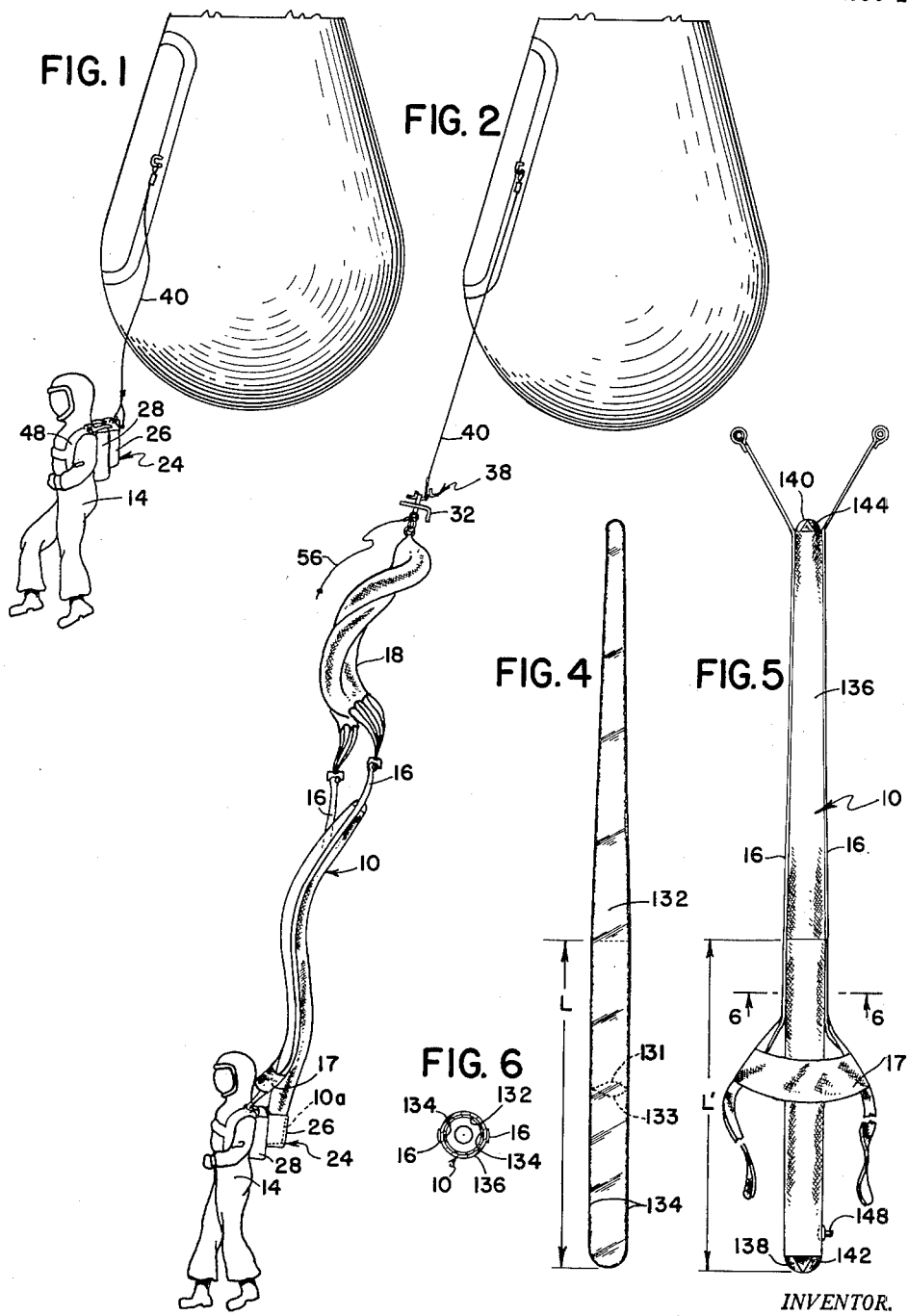

Oct. 2, 1962 H. G. HEINRICH 3,056,568
AERODYNAMIC RETARDATION DEVICE
Filed April 20, 1959 3 Sheets-Sheet 3
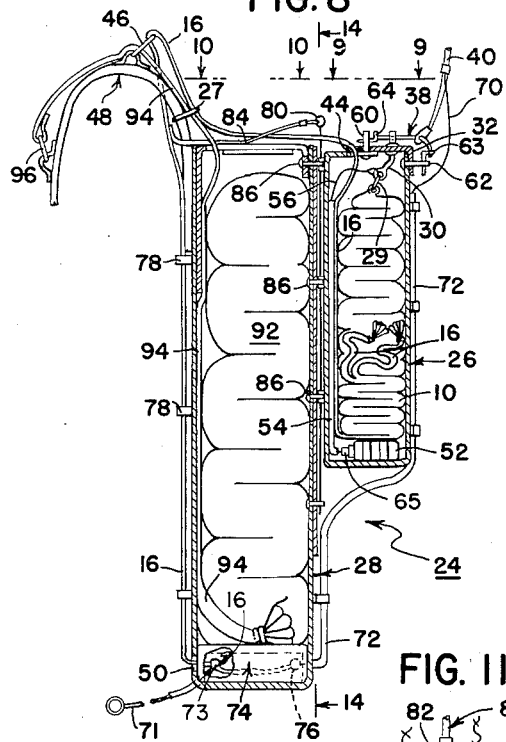
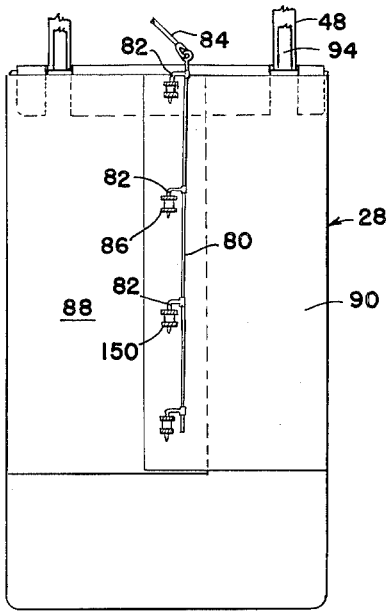
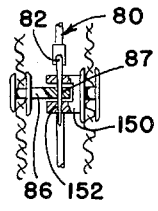
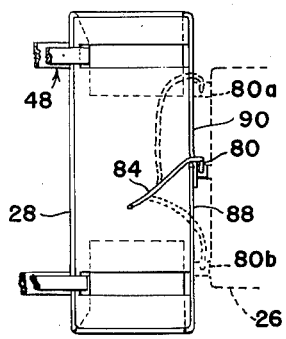
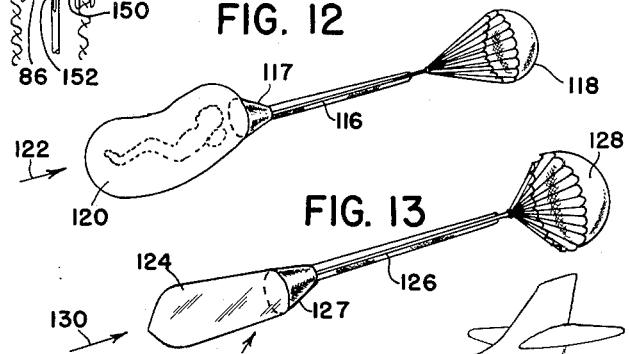
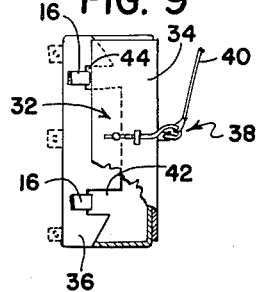
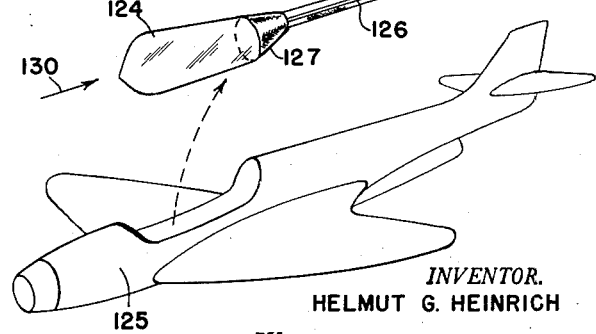
INVENTOR.
HELMUT G. HEINRICH
BY William C. Babcock
ATTORNEY United States Patent Office 3,056,568
Patented Oct. 2, 1962

3,056,568
AERODYNAMIC RETARDATION DEVICE
Helmut G. Heinrich, Minneapolis, Minn., assignor to General Mills, Inc., a corporation of Delaware
Filed Apr. 20, 1959, Ser. No. 807,612
21 Claims. (Cl. 244—147)

The present invention relates generally to aerodynamic retardation devices and more specifically to an anti-fouling retardation device for arresting the descent of a free falling object in a region of rarified air or any other rarefied gas.

The retardation and stabilization of a free falling object in a region of rarefied air or gas is a problem well known in the art. For example, at higher altitudes the density of the atmosphere is considerably reduced and a man or object released from a space vehicle, balloon gondola, missile or similar vehicle virtually falls as if in a vacuum. During an uncontrolled fall of this type wherein the body or object is in a state of continuous tumbling, a retardation device such as a parachute which is deployed at these altitudes has little or no retardation and stabilizing force, and it therefore has a tendency to remain in close proximity with the man or object and may become entangled with any existing projections or protrusions thereon. Consequently, the retardation and stabilization of a free falling object from a high altitude by means of a parachute or other retardation device, in addition to being difficult of its own accord, is further complicated by the existing problems stated above.

It is, therefore, an object of the present invention to provide an anti-fouling aerodynamic retardation device for stabilizing and arresting the descent of a free-falling object in outer space.

A further object of the invention is to provide an anti-fouling retardation device in the form of a parachute system in which rigid means is provided for maintaining a spaced relation between the parachute and the object to be arrested when the parachute is released for inflation.

A still further object of the invention is to provide an extendable beam which is carried by the man or object and is moved into an extended position when the parachute is deployed to maintain a rigid spaced relation between the man or object to be arrested and the parachute.

Another object of the invention is to provide an aerodynamic retardation device in which an inflatable beam is interposed between the retarding instrument and the object to be arrested and is inflated with the deployment of the retarding instrument to maintain a rigid spaced relation between the man or object and the retarding instrument.

Still another object of the invention is to provide an aerodynamic retardation device for a free-falling object in which first- and second-stage parachutes are employed and wherein the first-stage parachute is initially spaced apart from the object until the first-stage parachute is released from the object and the second-stage parachute is automatically deployed and inflated at a predetermined altitude.

Other objects and advantages will become apparent in the following specification and the appended drawings in which:

FIGURE 1 is a side elevational view of a parachutist during the first stage of a free fall parachute jump from a balloon gondola and illustrating one embodiment of the retardation device of the present invention;

FIG. 2 is a side elevational view like FIG. 1 but showing the parachutist during a further stage of the parachute jump with the retardation device in an unfurled condition;

FIG. 3 is a side elevational view like FIG. 2 showing the parachutist during a later stage of the jump with the retardation device in a fully extended or support position;

FIG. 4 is a side elevational view of the inflatable liner of a pressure beam employed according to the present invention;

FIG. 5 is a side elevational view of the shroud or outer liner of the pressure beam as assembled with the inflatable inner liner of FIG. 4;

FIG. 6 is a sectional view of the device of FIG. 5 taken generally along line 6—6 of that figure and showing the cross-sectional area of the assembled liner and shroud;

FIG. 7 is a side elevational view of the parachutist of FIGS. 1–3 showing the second stage parachute deployed during the latter portion of his descent;

FIG. 8 is a schematic side elevational view of a typical parachute pack as employed by the parachutist of FIG. 1;

FIG. 9 is a plan view of the first-stage parachute pack of the device of FIG. 8 as seen generally along line 9—9 of that figure;

FIG. 10 is a plan view of the secondary or main parachute pack as seen generally along line 10—10 of FIG. 8;

FIG. 11 is a schematic side elevational view in partial section of the means for effecting the attachment of the first- and second-stage parachute packs;

FIG. 12 is a plan view showing the deployment of the present device with an ejection capsule;

FIG. 13 is a perspective view showing the manner of employing the present device with the release of an aircraft canopy;

FIG. 14 is a sectional view taken generally along line 14—14 of FIG. 8 illustrating the rear flap closure and attachment means for the second-stage parachute pack;

FIG. 15 is an enlarged view of a portion of the pull pin assembly for releasing the first- and second-stage parachute packs; and FIG. 16 is a schematic side elevational view showing a manually operable rip cord assembly for actuating the parachute system.

Before proceeding with a detailed description of the invention, a brief presentation of its utility and manner of employment will be presented.

Essentially, the present invention provides a high-altitude aerodynamic stabilization and retardation system which prevents a deployed parachute from becoming entangled with the falling object to which it is attached. The term "parachute" is used herein in a general sense to include other air drag producing objects. Basically, the system utilizes an extendible beam which in the preferred embodiment is in the form of an inflatable pressure beam that is substantially rigid when inflated and is interposed between the parachute and the falling object in an initially collapsed or unextended state. The utility of the system is highly diversified and can be used to arrest practically anything in the nature of a free-falling object. In regard to this matter, reference will be made momentarily to FIGS. 1, 12, and 13, which illustrate some of the uses to which the system can be applied.

For example as seen in FIG. 1, the system is attached to and utilized by a parachutist 14. In FIG. 12 it is attached to and utilized by an enclosed capsule 120, which has been ejected from a space vehicle (not shown), and in FIG. 13 it is attached to and utilized by a canopy 124, which has been ejected from an aircraft 125.

In conjunction with the above it is, of course, understood that when an object is released from a space vehicle, whether it is a man, a weapon or a piece of equipment, the ultimate goal is to assure that the object reaches the ground safely. Should the object become entangled, as may occur with existing devices, the chances of recovering the object in a safe condition are substantially reduced.

As explained in the ensuing description, the present device assures the safe conduct and stability of the free-falling object by preventing entanglement and can be utilized with only silght modification of existing retardation equipment.

For example, one type of high-altitude parachute equipment known presently in the art consists of a first-stage parachute, a second-stage parachute, and in some instances a pilot chute which is attached to the second-stage parachute for extracting it from the pack. Since the latter is not necessary to an understanding of the invention, it is not shown or described herein. The above arrangement is generally formed into a composite parachute pack (somewhat like the pack 24 of FIG. 8) which is suitably attached by harness means to an object or to the back of an individual.

Generally speaking, the first-stage parachute is in most instances somewhat smaller than the second-stage parachute and is designed primarily for stabilizing and arresting the descent of the parachutist from a higher altitude while the second-stage parachute is designed to support the parachutist during the remainder of his descent at lower altitudes.

In actual practice the first-stage parachute is initially released from its pack when the parachutist leaves the aircraft or space vehicle, and during his descent, upon reaching a predetermined, lower altitude, the first-stage parachute is automatically released from the parachutist and the second-stage parachute is actuated for inflation in order to support the parachutist during the remainder of his descent.

As seen in FIG. 8, a substantial portion of the parachute pack of the present invention is constructed and arranged in a manner similar to the conventional device described above. Due to the design characteristics of the present system, however, the pack 24 incorporates many features which are not required of conventional equipment but which are necessary to the utilization and employment of the instant invention.

For example, the parachute pack 24 has incorporated therein a first-stage parachute pack 26 and a second-stage parachute pack 28, the above-mentioned packs having retained therein, in a collapsed state, a first-stage parachute 18, and a second-stage parachute 92, respectively. Also retained in a collapsed condition within the first-stage parachute pack 26 is an inflatable beam or boom 10 which is a linking means between the first-stage parachute and the parachute pack, and is secured thereto by riser harness straps 16. The inflatable beam 10 which is seen in an inflated state in FIG. 3 forms a particular feature of the invention and when inflated by an inflating cylinder 52, provides a spacing means in the form of a rigid extension between the first-stage parachute pack 26 and the first-stage parachute 18. The inflatable beam 10 extends vertically upward from the pack 26 when the first-stage parachute 18 is released therefrom and is supported by D rings 46 on the upper ends of the riser straps 16 of the inflatable beam. The riser straps 16 extend longitudinally along the sides of the inflatable beam 10 and are attached to a parachute release means in the lower end of the main parachute pack 28 as will be described further in the specification.

The inflatable beam 10 before its release is contained within the first-stage parachute pack 26 in the collapsed condition shown. The previously mentioned risers 16 to which the first-stage parachute 18 is attached are also folded in a collapsed condition between the beam 10 and the parachute 18. The folded state of the parachute 18 and the inflatable beam 10 need not be as shown in the drawings so long as they are contained within the pack 26 in such a way as to be released in the manner of the invention. The first-stage parachute 18, as seen in FIG. 8, occupies the upper portion of the parachute pack 26 and is attached at its upper end by a break cord 29 to a support pin 30 on the parachute cover 32. The cover 32 is formed as seen in FIG. 9 by overlying flaps 34 and 36 which are held in place by a release pin assembly 38, to which is attached a static line 40.

When the first-stage parachute 18 and the inflatable beam 10 are in the pack 26 in their collapsed state, the ends of the risers 16 which extend somewhat below the beam (see FIGS. 4 and 5) are folded so that they extend upwardly along the inside of the pack 26 and extend out of the pack 26 through openings 42 and 44 in the cover flaps 34 and 36. The risers 16 extend across the top of the main parachute pack 28 and over and through D-rings 46 attached to the shoulder harness 48. The risers continue downwardly after passing through the D-rings 46 (only one of which is shown in FIG. 8) and extend along a portion of the back of the pack 28. The straps continue downwardly along the pack 28 and enter apertures or openings 50 in the lower end of the main parachute pack 28 and are retained by a parachute release means 74 described hereinafter. Thus, while the first-stage parachute 18 and the inflatable beam 10 are in a collapsed state, the riser straps 16 are not in a load-carrying position, but are maintained with the parachute pack.

The inflatable beam 10 is designed for inflation when the first-stage parachute 18 is released, as by the static cord 40. The inflation is accomplished by one or more inflating cylinders such as 52 which are housed in the lower end of the first-stage parachute pack 26. A tubular flexible conduit 54 such as is well known in the art extends upwardly along the inside of the first-stage parachute pack 26 and supports a cable 56 therein which is attached at one end to the support pin 30 of the cover 32 and at its opposite end to a valving means on the inflating cylinder 52. The valving means 65 of the cylinder 52 is not described in detail but can be of any conventional known type which can be actuated by the cable 56.

The size of the cylinder or cylinders 52 employed in such a system will, of course, vary with the size of the pressure beam employed. The type of gas which appears to be suitable for inflating the beam 10 is of the type known in the art as a non-vaporizing gas, e.g. $CO_2$. In conjunction with the pressure beam 10, which will be hereinafter described in detail, it was found that in such a beam having an over-all length of around 9 feet and having a diameter tapering from a 5½″ diameter at its base to a 3¼″ diameter at its opposite end, that a pressure equal to 6.76 p.s.i. was sufficient to maintain the desired rigidity of inflation.

Having described the arrangement of the parachute 18 and the inflatable beam 10 as positioned in the parachute pack 26, reference will now be made to the manner of releasing or deploying the first-stage parachute 18 and the beam 10 from the pack 26. As seen in FIG. 1, one method of deploying the device of the present invention is by the use of a static line 40. The parachutist 14 of FIG. 1 has left the hatch or doorway 56 of a balloon gondola 58 and the static line 40, which is connected to the gondola is growing taut and is starting to apply tension to release the parachute 18. The pull pin assembly 38 (see FIG. 8) to which tension is applied by the static line 40 is a conventional device well known in the parachute art and its specific construction will be understood further in the specification when the details of the main parachute pack 28 are presented. As tension is applied by the descent of the man 14, the static line 40 causes the pull pin assembly 38 to extract pins 63 and 64 from openings in a pair of pin posts 60 and 62 which maintain the cover 32 in a closed relation and the cover 32 is then pulled free of the pack 26 by pull pin 64 which abuts against the support pin 30 to which the parachute 18 is attached by the break cord 28.

When the cover 32 is pulled free by the static cord 40 and the pin 64, tension is then being applied through the break cord 28 to the parachute 18 and it is extracted or deployed from the parachute pack 26 (see FIG. 2). As the parachute 18 is deployed from the parachute pack 26 the risers 16 likewise extract the beam 10. Furthermore, in proper timed relation with the release of the cover 32, tension is automatically applied to the cable 56 which opens the valve 65 on the cylinder 52 and the cylinder begins its inflation of the beam 10. Thus, in addition to the tension applied by the static line 40, the inflatable beam, as it is inflated, has a tendency to assist in the deployment of the parachute 18 from the pack 26. The parts are arranged to operate in appropriate sequence, so the withdrawal of the folded boom will not be hampered by binding caused by premature inflation of any part of the boom.

By the time the parachute 18 and the inflatable beam 10 are removed from the pack 26 the lower ends of riser straps 16 have accordingly passed free of the pack 26, snapping break cords 27 (FIG. 8) and have moved free of the slots 42 and 44 in the cover flap 36. The parachute 18 and the beam 10 are then connected to the parachutist by the risers 16 which are secured at their lower ends to the automatic parachute release 74 positioned within the main parachute pack 28.

The above arrangement can be readily understood by viewing FIG. 2 in conjunction with FIG. 8. As will be seen in FIG. 2, the riser straps 16 are of a length which will maintain the lower end 10a of the beam 10 within the pack 26. By the time the parachute 18 and the beam 10 have been moved to their extended position by the static line 40 and the inflation of the beam 10, tension is being continuously applied to the break cord 29 at the top of the parachute 18. The break cord 29 is such that a predetermined amount of tension will cause its destruction and thus free the upper end of the parachute 18 from the cover 32 and the static line 40. This can be seen more readily in FIG. 3 wherein the inflatable beam 10 is in a rigid state by virtue of its inflation and the parachute 18 has been released from the static line 40 by virtue of the destruction of the break cord 29.

During the above description it can be readily understood that at no time during the release of the parachute 18 and the inflation of the beam 10 does an opportunity occur for the parachutist 14 to become entangled with the shroud lines 22 of the parachute 18 since the beam 10, when inflated, provides a spacing means therebetween. Said beam 10, when inflated, is secured to the parachutist 14 so that its longitudinal axis is substantially parallel to the longitudinal axis of the parachutist. The beam can take various forms, as long as the length of the inflated, rigid beam is greater than the total length of the deployed parachute, suspension lines and the risers between said parachute and said beam, so that this total length cannot possibly become entangled with the parachutist or an object.

Turning now to other features of the invention, when initial tension is applied by the static line 40 it also actuates an additional pull cord or lanyard 70 which extends through a flexible conduit 72 attached to the lower end of the main parachute pack 28 and extends into the automatic parachute rip cord release 74. The parachute release 74 is not herein described in detail but it can be a device such as the type F-1A disclosed in the United States Air Force Parachute Handbook dated December 1956.

Essentially this type of rip cord release 74 is actuated by the tension applied to the lanyard 70. The timing mechanism 76 within the rip cord release 74 is actuated by the lanyard 70. The desired time period of the timing mechanism 76 is established prior to the parachute jump and is such as to automatically cause the actuation of standard squib devices 73 when the pre-set time interval has elapsed. The squib devices 73 are integral with the device 74, and serve as a cutting mechanism for severing the riser straps 16. (One squib device is provided for each riser 16; however, as viewed in FIGURE 8, only one such device is illustrated.) Simultaneous actuation of the squib devices severs the riser straps 16 and causes the release of the lower ends of the riser straps 16. The desired period of the time setting is normally established to allow for the stabilization of the airman or parachutist during his descent to an altitude of, for example, 20,000 feet, at which time the time period previously established is expired, causing the actuation of the squib device which severs the lower ends of the risers 16 to thereby release the inflated pressure beam 10 and the parachute 18.

An auxiliary pull cord 71 is provided which extends into the rip cord release 74. Pull cord 71 may be manually operated by the parachutist if for some reason pull cord 70 fails to actuate the rip cord release. Pull cord 71 actuates the rip cord release in substantially the same manner as described above.

As can be seen in FIG. 8, upon the release of the lower ends of the risers 16 by the parachute release 74, the weight of the parachutist or airman is sufficient to cause the straps to pull free of their guide brackets 78 and move out of the D-rings 46 of the shoulder harness. At this time the parachutist or airman is free of the first-stage parachute and the pressure beam 10, which is pulled out of the pack 26. The first-stage parachute pack 26, however, is attached to the second-stage parachute pack by a locking pin cable assembly 80, which is provided with locking pins 82 as seen more particularly in FIG. 14. Assembly 80 and the previously mentioned pull pin assembly 38 are of substantially identical construction. The locking pin assembly 80 is secured at one end to an extension cord 84 (FIG. 8) which is attached at its support end above the top of the pack 28 to one of the riser straps 16. Thus, as the riser straps move free of the D-ring 46, the line 84 is carried therewith, causing the pin assembly 80 to extract the pins from locking lugs 86 on the parachute packs 26 and 28, respectively.

As the pin assembly 80 retracts the pins 82, the pack 26, of course, moves free of the main parachute pack 28. Accordingly, as the pack 26 is detached from the main pack 28, the conduit 72 of the lanyard 70 is pulled free of its mounting, since the lanyard was previously detached from the parachute rip cord release 74. As the pin assembly 80 is retracted, the pins 82 release cover flaps 88 and 90 (see FIG. 14) which form the rear portion of the main parachute pack 28. These are no longer held in a closed relation and therefore the main parachute 92 is free to tumble out of the opening caused by the release of the pin assembly 80. While only one pin assembly such as 80 is described above, it will be realized that in order to maintain adequate attachment of the parachute pack 26 to the main parachute pack 28 that other similar assemblies such as those shown in dotted outline in FIG. 10 and indicated by the numeral 80a and 80b might be employed. Such assemblies are, of course, attached to the common line 84 and would be simultaneously extracted in the manner of the pull pin assembly 80 to detach the parachute pack 26. In order to accommodate the pull pin assemblies 80a and 80b, the parachute pack 26 is provided with attaching brackets 150 (see FIG. 11) which are riveted or secured to the pack 26 in spaced vertical alignment, and into which project the locking pins 86 to align holes 152 in the brackets with holes 87 in the locking lugs 86 so that attachment and detachment of the parachute pack 26 to the main pack 28 is facilitated.

The second-stage parachute, indicated generally by the numeral 92, upon moving free of the pack 28, still remains attached thereto by virtue of harness straps 94 which extend through the D-ring 46 and are attached to a similar D-ring 96 on the chest straps of the shoulder harness 48. Therefore, once the pin assembly 80 is removed, the parachute 92 tumbles free of the pack 28 and billows to an inflated position above the parachutist as seen in FIG. 7. By the time the second-stage parachute is opened by the pull pin assembly 80 the parachutist has descended to an altitude presumably lower than 20,000 feet and the density of the air is sufficient to inflate fully the second-stage parachute or its pilot chute if one is included.

In the above description one method of employing the present invention is described. However, several modifications of the invention are possible, some of which are described hereafter. For example, as seen in FIG. 16, an inherent rip cord assembly 98 is employed so that the parachutist, such as 14, would not be required to depend upon the static line 40, but could, by pulling the flexible cable 100, cause the release of the first-stage parachute and accordingly would apply tension to the lanyard 102 to cause actuation of the lanyard and energize the automatic parachute release 74. The rip cord assembly 98 of FIG. 16 is shown in conjunction with a pack 114 which is designed to release the top flap or cover 104 and a partial rear cover 103 which would for practical purposes swing downwardly in the direction of the arrow 106, and in this particular instance the inflation of the pressure beam 10 would tend to release the first-stage parachute 18 therefrom. Additionally the rip cord assembly 98 would also actuate the inflating cylinder 52 of the beam 10 by line 112 to cause inflation thereof to move the parachute 108 out of the pack 114 as above described. Likewise, straps 16 would move free of laterally extending slots 108 to move into a support position and the lower end of the beam 10 would remain in the lower end 110 of the pack as the parachute and beam are moved by the weight of the chutist to a vertical or upright position.

The specific utility of the present invention is not limited to the embodiment shown, but has a multiplicity of uses, particularly in the scope of its principles, only some of which are touched on in this application. For example, as seen in FIG. 12, the inflatable beam 116 is utilized in conjunction with an ejection capsule such as 120 and a parachute 118. An inflatable member 117 is provided and forms the lower portion of the inflatable beam 116. Member 117 is secured to the capsule 120 and aids in assuring a more stable and rigid base for the beam 116. Member 117 further aids in maintaining the beam in a desired direction relative to the capsule 120. For this purpose member 117 is illustrated as being conical; however, any modification could be used which effectively broadens the point of connection of the beam 116 to the capsule 120. The entire unit, comprised of the beam 116, member 117, and parachute 118, may be housed within a portion of the capsule 120 prior to the time that the capsule is ejected from its initial position within a space vehicle. Of particular note is the fact that the inflatable beam 116 extends the parachute 118 away from the capsule 120 in a direction generally parallel to the longitudinal axis of the direction of movement of the capsule, as shown by the arrow 122. Thus, such an arrangement prevents possible entanglement with the capsule 120 and the parachute 118.

A further embodiment is shown in FIG. 13 in which the invention is used to stabilize and retard the movement of an ejected aircraft canopy 124. In the embodiment of FIG. 13 the pressure beam 126 maintains the parachute 128 in a spaced relation with the aircraft canopy 124 and, as will be noted from the drawing, the beam 126 again extends in a direction which is substantially parallel to the direction of movement of the ejected canopy 124 as indicated by the arrow 130. Inflatable member 127 is provided in substantially the same manner and for substantially the same purpose as described hereinbefore for member 117 of FIG. 12.

While the above examples are presented as being somewhat typical, it will be realized that the employment of the invention with other devices for retarding the movement of other space objects is highly feasible and its use in conjunction with such devices is envisioned as a part of this invention.

The specific construction of the pressure beam as herein employed is shown in FIGS. 4, 5 and 6. The pressure beam 10 can be constructed in any desired size and may assume numerous shapes and configurations. However, as an illustration, in one preferred embodiment the pressure beam 10 is of the 9 ft. length previously described and is composed of an inner liner 132 and an outer liner 136. The inner liner 132 is formed of a lightweight sheet material such as polyethylene but may be constructed of other lightweight gas-imprevious material. The liner 132 is formed of similar sheets 131 and 133 of material which are secured together at their outer edges by a continuous seam 134. As will be noted, the liner 132 has a greater diameter over the lower portion of its length, as indicated by the dimension L, and has a somewhat reduced diameter at its upper end or end adjacent the attachment of the parachute 18. The above configuration has particular advantage in that the greatest bending moment appears to occur at the lower end of the beam. Therefore, by reducing the diameter of the beam at its upper end, a savings in material and weight is effected, and strength and rigidity are still maintained when the beam is inflated.

The outer liner 136 of FIG. 5 is provided with the same configuration of the lower portion which is indicated by the dimension L', and the end opposite is tapered to a configuration in accordance with the liner 132. In the present instance the outer liner 136 is constructed of a nylon fabric which has seamed semi-circular ends 138 and 140 which are formed by a plurality of segments 142 and 144. While nylon has been specified in the preferred embodiment, it is to be realized that other types of material, such as rubberized or coated textile fabrics are highly feasible in the construction of the beam. Accordingly, such a beam can conceivably be constructed of such a fabric and have an integral lining therewith so that a separate liner would not be required. Beam 10 is inflated through valve 148.

Turning now to the riser straps 16. The riser straps 16 are secured to the outer liner 136 such as by sewing or cement, or any other suitable manner and extend substantially along opposing sides of the nylon shroud 136 with their ends extending sufficiently above and below the nylon shroud as to permit their attachment to the second-stage parachute pack 28 and the first-stage parachute 18, respectively. In some cases a headrest 17, as shown for example in FIG. 5, may be provided to prevent the parachutist's head from becoming entangled with the risers or the beam 10. Headrest 17 is secured to the lower portion of the risers 16, and may be of a lightweight, flexible material such as polyethylene. In some instances more than two riser straps can be employed, depending upon the load requirement, and strengthening tapes may also be employed. Also attached in known manner to the beam 10 (FIG. 5) is a suitable end fitting or coupling 148 which is utilized for attaching the valve 64 to the cylinder 52.

In the above description a disclosure of the principles of this invention is presented, together with some of the embodiments by which the invention can be carried out.

I claim:

1. An aerodynamic retardation device for a freely falling object comprising in combination a container attached to the falling object, a parachute initially folded in said container, means for opening said container so that the parachute can be released therefrom, linking means for connecting the falling object to the parachute, said linking means including an inflatable beam which spaces the parachute from the falling object, said inflatable beam being of sufficient length when inflated to prevent the parachute from becoming entangled with the falling object before the said parachute becomes deployed, means for attaching one end of said beam to the parachute, means for attaching the other end of said beam to the falling object, and means for inflating the beam.

2. The combination of claim 1 wherein the inflatable beam is comprised of two liners, an inner tubular liner which is comprised of a flexible airproof material, said inner liner providing a flexural stiffness to the beam when it is inflated with a gas, and an outer tubular liner which is of sufficient durability to withstand the resultant tensional stress induced by the occurring retardation forces caused by the opening of the parachute.

3. The combination of claim 1 wherein the means for inflating the beam includes a gas cylinder of sufficient capacity to inflate said beam, means providing a passage for movement of gas between the cylinder and the beam, valve means for controlling the passage of gas into the beam, and means for automatically causing the actuation of said valve means to inflate said inflatable beam.

4. The combination of claim 1 wherein the inflatable beam is attached to the falling object so that the longitudinal axis of said beam when inflated is substantially parallel to the desired direction of movement of the falling object and means for attaching said beam to the object and maintaining said relative position between the object and the beam.

5. An aerodynamic retardation device for a freely falling object comprising in combination a container attached to the falling object, a parachute initially folded in said container, means for opening said container so that the parachute can be released therefrom, linking means for preventing the falling object from becoming entangled with the parachute when said parachute is released from the container, said linking means including an inflatable beam which spaces the parachute from the falling object, means for attaching one end of said beam to the parachute, means for attaching the other end of said beam to the falling object, and means for inflating the beam, said beam when inflated being attached to the falling object so that the longitudinal axis of said beam is substantially parallel to the desired direction of movement of the falling object, the length of said beam when inflated being greater than the deployed parachute, so as to maintain all portions of said parachute spaced from the falling object at all times.

6. The combination of claim 5 wherein the parachute attachment end of the inflated beam is of smaller cross sectional area than the cross sectional area of the other end of said beam, so that the surface of said beam tapers from a point near one end of said boom to a lesser dimension at the other end of said boom.

7. An aerodynamic retardation device for a freely falling object comprising in combination a first parachute, inflatable, spacing means attached to said first parachute to prevent the falling object from becoming entangled with said parachute, means for attaching said inflatable means to the falling object, the length of said inflatable means when inflated being greater than the deployed first parachute so as to maintain all portions of said parachute spaced from the falling object at all times, means for inflating said spacing means, a second parachute secured to the falling object, and means for opening said second parachute from an initially collapsed condition to an inflated condition at a desired time.

8. An aerodynamic retardation device for a freely falling object comprising in combination a container attached to said falling object, a first parachute initially folded in said container, means for opening said container so that the parachute can be removed therefrom, linking means attached to the parachute for preventing the falling object from becoming entangled with the parachute when said parachute is released from the container and before said parachute has become deployed, said linking means including an inflatable boom and at least one attachment means for connecting said boom to the falling object, means for attaching the parachute to the said boom, said boom when inflated spacing said parachute from the falling object, a second container attached to the falling object, a second parachute which is initially folded in said second container, means for opening said second container so that the second parachute can be released therefrom, and means for severing the attachment means so that the first parachute and inflatable boom may be released from the falling object.

9. An aerodynamic retardation device for a freely falling body comprising in combination a parachute pack having parachute harness means for attachment to said body, said pack having first and second compartments, a first-stage parachute initially folded in the first compartment of said pack, means for removing the parachute from said compartment while the body is in free fall, inflatable, extensible means contained in said first compartment for spacing said parachute from the falling body, attachment means for connecting said inflatable means to the falling body, said inflatable means when inflated and extended preventing the falling body from becoming entangled with the parachute when said parachute is released from the container and before said parachute has become deployed, means for inflating said inflatable means regardless of the environment, a second-stage parachute initially folded in the second compartment of the parachute pack, means for severing the attachment means so that the first-stage parachute may be released from the falling body, and means for releasing the second-stage parachute from the second compartment, said means being actuated in response to release of the first-stage parachute from the falling body.

10. The combination of claim 9 in which the means for removing the first-stage parachute from the first compartment includes a static line of predetermined length, means for attaching one end of said static line to a space vehicle from which the falling body is to be dropped, means for attaching a second end of said static line to the apex of the first-stage parachute which is folded within the first compartment of the parachute pack, said compartment having an openable end so that as tension is applied to the static line the parachute will open the openable end of said compartment and will be extracted from said parachute pack, and means to separate the static line from the first stage parachute as the line becomes taut.

11. The combination of claim 9 in which the means for removing the first-stage parachute from the first compartment includes a static line of predetermined length, means for attaching one end of said static line to a space vehicle from which the falling body is to be dropped, means for attaching a second end of said static line to an openable end of the first compartment of the parachute pack, the inflatable extensible means expelling the first-stage parachute out of said compartment when said compartment has been opened and as said inflatable means is inflated, and means to separate said static line from the parachute pack as said line becomes taut.

12. The combination of claim 11 in which the inflatable, extensible means comprises a gas-inflatable boom which forces said parachute out of the parachute pack as said boom is inflated with gas, said inflation means comprising means to fill said boom with gas at a desired time, valve means operatively connected to said inflation means to control the passage of gas into the boom, and means to actuate said valve means, said means to actuate said valve means being actuated in response to the opening of the first compartment.

13. The combination of claim 9 in which the first compartment has a detachable end, means for removing the first-stage parachute including a static line of predetermined length, means for attaching one end of said static line to a space vehicle from which the falling body is to be dropped, means for attaching a second end of said static line to the detachable end of the first compartment, means for connecting the first-stage parachute to said detachable end so that the parachute will be extracted from the first compartment in response to the removal of the detachable end, and means to separate the first-stage parachute from the detachable end as the static line becomes taut.

14. The combination of claim 13 in which the separation means to disconnect the parachute pack from the detachable end of the first compartment consists of breakcords which sever when a predetermined weight is attached.

15. An aerodynamic retardation device for a freely falling body comprising in combination a parachute pack having a parachute harness means for attachment to said body, said pack having first and second compartments, a first-stage parachute initially folded in the first compartment of said pack, means for removing the parachute from said compartment while the body is in free fall, an inflatable, extensible boom contained in said first compartment, attachment means for connecting said inflatable means to the falling body, means for attaching the parachute to said boom, said boom, when inflated and extended preventing said parachute from becoming entangled with the falling body while said parachute is being deployed, means for inflating said boom, a second-stage parachute initially folded in the second compartment of the parachute pack, means for severing the attachment means so that the first-stage parachute and the inflatable boom may be released from the falling body, and means connected to the boom for opening the second compartment of the parachute pack as the first stage parachute and boom are released from the falling body.

16. The combination of claim 15 wherein the means for severing the attachment means includes a cutting mechanism connected to the falling body, and means operatively connected to said cutting mechanism to actuate said cutting mechanism, said means adapted to be actuated at a predetermined stage of descent.

17. An aerodynamic retardation device for a freely falling object comprising in combination a container which is attached to said falling object, said container having two compartments, a first-stage parachute contained in a first compartment and releasable therefrom, a second-stage parachute contained in a second compartment and releasable therefrom at a later desired time, linking means for spacing the first-stage parachute from the falling object, said linking means including an elongated inflatable boom, the length of said boom when inflated being greater than the deployed first-stage parachute so as to maintain all portions of said parachute spaced from the falling object at all times, means for inflating said boom, means for attaching said inflatable boom to the first-stage parachute, said means comprising a plurality of risers which are secured to and extend longitudinally of the boom, means for attaching one end of the risers to the first-stage parachute, and means for attaching a second end of said risers to the falling object.

18. An aerodynamic retardation device for a freely falling parachutist comprising in combination a parachute pack having a parachute harness means for attachment to said parachutist, said pack having first and second compartments, a first-stage parachute initially folded in the first compartment of said pack, means for opening said first compartment while the parachutist is in free fall, linking means for spacing the first-stage parachute from the falling parachutist, said means including an inflatable tubular pressure beam, said beam initially folded in the first compartment of the pack, means for attaching said beam to the first-stage parachute, said means including risers which are secured to and extend longitudinally of the beam, means for attaching one end of the risers to the parachute, means for attaching a second end of said risers to the parachute harness, means for inflating said beam, said means including at least one pressure beam actuator comprised of a gas cylinder and a valve means, means for actuating said pressure beam actuator when the first compartment is opened, the pressure beam when inflated being of substantially greater length than the length of the deployed first-stage parachute, said beam extending so that its longitudinal axis is substantially parallel to the longitudinal axis of the parachutist, a second stage parachute initially folded in the second compartment of the parachute pack, means for releasing the first-stage parachute and the pressure beam from the parachute harness, said means including a cutting device which severs the risers which attach the pressure beam to the parachute harness, and means for opening the second compartment in response to the release of the first-stage parachute and pressure beam from the falling parachutist.

19. An aerodynamic retardation device for a freely falling object, said object having a given axis to be maintained in a substantially vertical direction during descent, a container attached to the falling object, a parachute initially folded in said container, means for opening the said container so that the parachute can be released therefrom, linking means for preventing the falling object from becoming entangled with the parachute when said parachute is released from the container, said linking means including an inflatable beam which spaces the parachute from the falling object, the length of said beam when inflated being greater than the deployed parachute so as to maintain all portions of said parachute spaced from the falling object at all times, said beam when inflated being fixedly attached to the falling object so that the longitudinal axis of said beam extends in the same general direction as the given axis of the object, means for attaching one end of said beam to the parachute, means for attaching the other end of said beam to the falling object, and means for inflating the beam.

20. An aerodynamic retardation device for a freely falling object comprising in combination a container attached to the falling object, a parachute initially folded in said container, means for opening said container so that the parachute can be released therefrom, linking means for preventing the falling object from becoming entangled with the parachute when said parachute is released from the container, said linking means including an inflatable beam which spaces the parachute from the falling object, the length of said beam when inflated being greater than the deployed parachute, so as to maintain all portions of said parachute spaced from the falling object at all times, means for attaching the parachute to a first end of the beam, means for attaching a second end of said beam to the falling object, and means for inflating said beam regardless of the environment.

21. An aerodynamic retardation device for a freely falling object comprising in combination a parachute, inflatable, extensible means between said parachute and falling object, said inflatable means when inflated forming a substantially rigid member between the object and the parachute and being of sufficient length to prevent the parachute from becoming entangled with the falling object before said parachute becomes deployed, and means for inflating said inflatable means.

References Cited in the file of this patent

UNITED STATES PATENTS

| | | |
|---|---|---|
| 1,189,112 | Howorth | June 27, 1916 |
| 1,342,221 | McDonald | June 1, 1920 |
| 1,499,266 | Vieregg | June 24, 1924 |
| 2,282,234 | Minich | May 5, 1942 |
| 2,551,609 | Kohr et al. | May 8, 1951 |
| 2,582,113 | Finken et al. | Jan. 8, 1952 |
| 2,675,198 | Reihman | Apr. 13, 1954 |
| 2,676,655 | Hatfield | Apr. 27, 1954 |
| 2,725,204 | Horning | Nov. 29, 1955 |
| 2,744,700 | Jehn | May 8, 1956 |